United States Patent [19]

Hanzawa

[11] Patent Number: 4,997,797
[45] Date of Patent: Mar. 5, 1991

[54] METHOD OF EFFECTING GLASS-CAPSULE HIP FOR CERAMIC FORMED BODY

[75] Inventor: Shigeru Hanzawa, Nagoya, Japan
[73] Assignee: NGK Insulators, Ltd., Japan
[21] Appl. No.: 404,429
[22] Filed: Sep. 8, 1989
[30] Foreign Application Priority Data Sep. 21, 1988 [JP]  Japan ................... 63-235078

[51] Int. Cl.$^5$ .................. C04B 35/46; C04B 35/48
[52] U.S. Cl. ...................... 501/96; 501/97; 264/62; 264/65
[58] Field of Search ................ 501/96, 97; 264/62, 264/65

[56] References Cited
U.S. PATENT DOCUMENTS 4,495,123 1/1985 Honold et al. ................ 501/96
4,820,665 4/1989 Ukai et al. ................... 501/97
4,870,036 9/1989 Yeh ............................ 501/97

FOREIGN PATENT DOCUMENTS 59-35870 8/1984 Japan .

Primary Examiner—William R. Dixon, Jr.
Assistant Examiner—Alan Wright
Attorney, Agent, or Firm—Parkhurst, Wendel & Rossi

[57] ABSTRACT

In a method of effecting a glass-capsule HIP for producing a ceramic fired body having a porosity of less than 0.1%, a residual sintered carbon amount and/or an absorbed water amount in a ceramic formed body before inserting into the glass-capsule are set to predetermined values. Therefore, it is possible to obtain a ceramic sintered body having a high density and a high flexural strength.

9 Claims, 1 Drawing Sheet

FIG_1
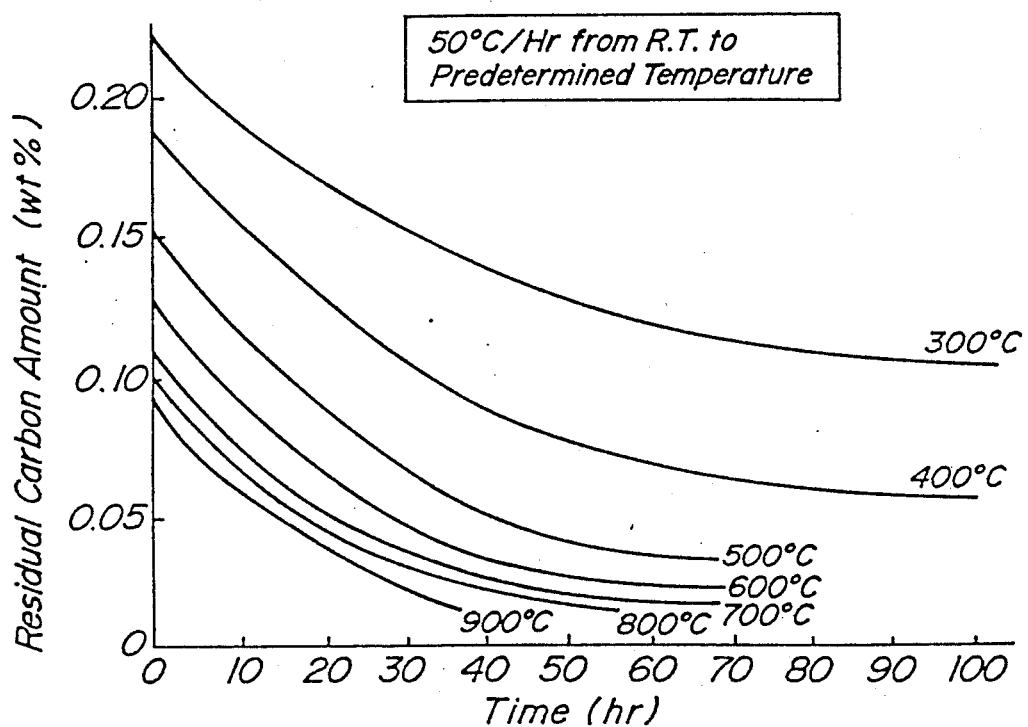

METHOD OF EFFECTING GLASS-CAPSULE HIP FOR CERAMIC FORMED BODY

BACKGROUND OF THE INVENTION

Field of the Invention and Related Art Statements

The present invention relates to a method of hot isostatic pressing after a ceramic formed body after the body is set in a glass capsule thereby obtaining a ceramic sintered body of high density. Hereinafter, this method will be referred to as a glass-capsule HIP method.

It is well known that, in the glass-capsule HIP method, all the surfaces of the ceramic formed body to be sintered are surrounded by a glass film having gas-tight characteristics, and then a hot isostatic pressure such as 100~3000 atm at 1000°~2300° C. is applied to the ceramic formed body covered with the glass film so as to obtain a ceramic sintered body of high density.

In this case, the ceramic powders are formed with 2~5 wt % polyvinyl alcohol (PVA) to maintain a forming strength of the ceramic formed body. Therefore, in order to remove the polyvinyl alcohol, the ceramic formed body is kept in an atmosphere at 500° C., 10~20 hrs. Moreover, when the ceramic formed body is fired, 5~20 wt % of MgO, $Y_2O_3$, $Al_2O_3$ are added as sintering agents, and a matrix ceramic formed body such as silicon nitride powders always includes 2~3 wt % of $SiO_2$.

However, if the ceramic formed body, in which several materials mentioned above remain, is used for the glass-capsule HIP method, the following drawbacks occur and thus a ceramic sintered body of high density can not be obtained.

(1) Since PVA is added, about 1 wt % of carbon remains in the ceramic formed body. The residual carbon and the residual oxide then reacted at high temperatures, and consequently CO gas or $CO_2$ gas is generated in the glass-capsule. Therefore, the glass-capsule is expanded from the inside due to the generation of CO or $CO_2$ gas, and, in an extreme case, the glass-capsule is broken.

(2) The sintering agents such as MgO, $Y_2O_3$, $Al_2O_3$ easily absorb a water component, and the water component once absorbed in the sintering agents can hardly be removed. If once removed, the sintering agents easily absorb a water component in the air again during storage in a storehouse. Therefore, the residual water component in the ceramic formed body is vaporized at high temperatures, and thus the glass-capsule is expanded from the inside. In an extreme case, the glass-capsule is also broken.

The above problems are unique to the glass-capsule method, and thus, in the normal HIP operation using no glass-capsule, the thus generated $H_2O$, CO, $CO_2$ gases are mixed with the atmosphere and do not affect the sintering operation. Therefore, in order to solve the problems mentioned above, the known methods for making high density ceramic sintered bodies are not applied to the glass-capsule HIP method.

SUMMARY OF THE INVENTION

An object of the present invention is to eliminate the drawbacks mentioned above and to provide a glass-capsule HIP method which can obtain a ceramic sintered body having a high density.

According to a first aspect of the invention, a method of effecting a glass-capsule HIP for producing a ceramic sintered body having a porosity of less than 0.1%, comprises a step of effecting a hot isostatic press (HIP) using the qlass-capsule under the condition such that a ceramic formed body having a residual carbon amount of less than 0.1 wt % is set in the glass-capsule.

According to a second aspect of the invention, a method of effecting a glass-capsule HIP for producing a ceramic sintered body having a porosity of less than 0.1%, comprises a step of effecting a hot isostatic press (HIP) using the glass-capsule under the condition such that a ceramic formed body having an absorbed water amount of less than 0.5 wt % is set in the glass-capsule.

In the construction according to the first aspect of the invention, we have found that, if a carbon amount remaining in the ceramic formed body is limited to less than 0.1 wt %, the generation of CO gas or $CO_2$ gas can be reduced and the ceramic sintered body having a high density can always be obtained.

Moreover, in the construction according to the second aspect of the invention, we have found that, if an amount of water component absorbed in the ceramic formed body before installing in the glass-capsule is limited to less than 0.5 wt %, the generation of $H_2O$ gas can be reduced and the ceramic sintered body having a high density can always be obtained.

As to a technique for limiting a carbon amount remaining in the ceramic formed body to less than 0.1 wt %, there is a method wherein the ceramic formed body is kept under the atmosphere (i.e., air ) at a temperature of 500°~900° C., for more than 30 hrs. For reference, a relation between the residual carbon amount and firing time is shown in FIG. 1 when the preliminary firing at various temperatures is performed with respect to the silicon nitride body including 2 wt % of PVA as an extrapolated value.

Moreover, in this invention, the types of ceramic formed bodies for HIP operation are not limited and various kinds of ceramic formed bodies can be used. However, it is preferred to use a ceramic nitride body including more than 60 wt % of $Si_3N_4$, BN or AlN, since the advantages of the present invention can be effectively obtained.

BRIEF DESCRIPTION OF THE DRAWING

FIG. 1 is a graph showing a relation between a residual carbon amount and a condition of a preliminary firing according to the invention.

DESCRIPTION OF THE PREFERRED EMBODIMENTS

Hereinafter, one actual embodiment according to the invention will be explained.

EXAMPLE 1

Ceramic formed bodies with a predetermined shape including 95 wt % of $Si_3N_4$, 2 wt % of MgO, 3 wt % of $Al_2O_3$; and 2 wt % of PVA as an extrapolated value were preliminarily fired under the atmosphere (i.e., air) at various conditions as shown in Table 1. A carbon amount remaining in the preliminarily-fired ceramic formed bodies was measured.

Next, the thus preliminarily-fired ceramic formed body was inserted and fused into a glass-capsule, and a HIP operation was performed under the condition of 700 atm, 1750° C., 1 hr keep. After that, with respect to the thus obtained ceramic sintered body, a flexural strength using four support points of the ceramic sintered body was measured according to JIS R1601, and a porosity of the ceramic sintered body was measured by means of an image analysis method. In this case, the porosity was defined as a summed up value of pores remaining in a constant area. Results of these measurements are shown in Table 1.

TABLE 1

| Specimen No. | Residual carbon amount (wt %) | Preliminary-firing under the atmosphere (°C. × hr) | Flexural strength (MPa) | Porosity (%) | Comment |
|---|---|---|---|---|---|
| 1 | 0.15 | 400 × 10 | 800 | 0.45 | Comparison |
| 2 | 0.10 | 400 × 35 | 900 | 0.10 | Present invention |
| 3 | 0.08 | 400 × 40 | 960 | 0.08 | Present invention |
| 4 | 0.05 | 500 × 40 | 1000 | 0.05 | Present invention |
| 5 | 0.03 | 500 × 50 | 1050 | 0.05 | Present invention |
| 6 | 0.03 | 600 × 40 | 1100 | 0.04 | Present invention |
| 7 | 0.02 | 600 × 70 | 1200 | 0.04 | Present invention |
| 8 | 0.02 | 800 × 40 | 1000 | 0.03 | Present invention |

From the results shown in Table 1, the specimen Nos. 2 to 8 including the residual carbon amount within the scope of the invention have a low porosity and a high flexural strength of the sintered body after the HIP operation.

EXAMPLE 2

As in the same manner as in Example 1, ceramic formed bodies with a predetermined shape including 95 wt % of $Si_3N_4$, 2 wt% of MgO, 3 wt % of $Al_2O_3$ were kept under the atmosphere at 600° C., 40 hrs so as to control their water components. After that, water amounts in the ceramic formed bodies were increased by keeping the ceramic formed body under the condition such as temperature of about 29° C., humidity of 80% and keeping time shown in Table 2.

Next, the ceramic formed body, in which the absorbed water amount was controlled, was immediately inserted and fused into a glass-capsule, and a HIP operation was performed under the condition of 2000 atm, 1750° C., 1 hr keep. After that, with respect to the thus obtained ceramic sintered body, the flexural strength and the porosity were measured as is the same as the Example 1. Results of these measurements are shown in Table 2.

TABLE 2

| Specimen No. | Keep condition | Relative weight variation (%) | Absorbed water amount (wt %) | Flexural strength (MPa) | Porosity (%) | Comment |
|---|---|---|---|---|---|---|
| 1 | no | 100 | 0 | 1100 | 0.04 | Present invention |
| 2 | 6 hr | 100.3 | 0.3 | 1050 | 0.07 | Present invention |
| 3 | 10 hr | 100.5 | 0.5 | 1000 | 0.08 | Present invention |
| 4 | 24 hr | 100.8 | 0.8 | 960 | 0.10 | Comparison |
| 5 | 72 hr | 101.2 | 1.2 | 920 | 0.11 | Comparison |

From the results shown in Table 2, the specimen Nos. 1 to 3 including the absorbed water amount within the scope of the invention have a low porosity and a higher flexural strength.

The ceramic formed bodies according to the Examples 1 and 2 mentioned above as the present invention have a flexural strength more than 900 MPa which is necessary for actual members such as a turbo charger rotor, an automobile member like a pre-combustion chamber, etc. and bearings. Moreover, they have a porosity of less than 0.1% which is necessary for actual members such as wear resistance members like bearings.

The present invention is not limited to the embodiments mentioned above, but various modifications are possible within the scope of the invention. In the embodiments mentioned above, use is made of $Si_3N_4$ as a main component, but the other nitride ceramics such as BN, AlN can be used in the same manner and have the same advantages. Moreover, in order to reduce the water component, a control of the absorbed water amount can be performed not only in the atmosphere (i.e., air) but also in an inert gas or in a vacuum gas. Further, in the embodiment mentioned above, the first aspect of the invention and the second aspect of the invention are performed separately, but they can be performed at the same time by means of the glass-capsule if the conditions satisfy the both requirements. In this case, it is possible to obtain a ceramic sintered body having better characteristics. Further, as to the HIP technique using the glass-capsule, it is possible to use the technique disclosed in, for example, Japanese Patent Publication No. 59-35870.

As clearly understood from the above, according to the invention, since the residual carbon amount and/or the absorbed water amount in the ceramic formed body before inserting into the glass-capsule are set to predetermined values, it is possible to obtain the ceramic sintered body having a high density and a high flexural strength.

What is claimed is:

1. A method of producing a sintered ceramic body comprising at least one material selected from the group consisting of $Si_3N_4$, BN, and AlN, said body having a porosity of less than 0.1%, said method comprising the steps of:
   forming a ceramic body;
   preliminarily firing the formed ceramic body in air at a temperature of about 500°–900° C. for at least 30 hours to form a preliminarily-fixed ceramic body having a residual carbon amount of less than 0.1 wt %;
   inserting and fusing said preliminarily-fired ceramic body into a glass-capsule; and
   hot isostatic pressing the glass-encapsulated ceramic body to form said sintered ceramic body.

2. The method of claim 1, wherein said glass-encapsulated ceramic body is hot isostatic pressed for about 1 hour at a pressure of about 700 atm and a temperature of 1750° C.

3. The method of claim 1, wherein said sintered ceramic body has a flexural strength of at least 900 MPa.

4. The method of claim 1, wherein said sintered ceramic body has a flexural strength of at least 1000 MPa.

5. The method of claim 1, wherein said formed ceramic body comprises at least 60 wt % of said at least one material selected from the group consisting of $Si_3N_4$, BN or AlN.

6. A method of producing a sintered ceramic body comprising at least one material selected from the group consisting of Si$_3$N$_4$, BN, and AlN, said body having a porosity of less than 0.1%, said method comprising the steps of:
forming a ceramic body;
heating the formed ceramic body in air at a temperature of about 600° C. for about 40 hours to reduce an absorbed water amount in said body to less than 0.5 wt %;
inserting and fusing the heated, formed ceramic body into a glass-capsule; and
hot isostatic pressing the glass-encapsulated ceramic body to form said sintered ceramic body.

7. The method of claim 6, wherein said glass-encapsulated ceramic body is hot isostatic pressed for about 1 hour at a pressure of about 2000 atm and a temperature of about 1750° C.

8. The method of claim 6, wherein said sintered ceramic body has a flexural strength of at least 1000 MPa.

9. The method of claim 6, wherein said formed ceramic body comprises at least 60 wt % of said at least one material selected from the group consisting of Si$_3$N$_4$, BN or AlN.

* * * * *